INVENTOR.
KARL A. DAVIS
BY
ATTORNEY

June 29, 1965  K. A. DAVIS  3,191,436
ELECTROMAGNETIC FLOWMETER
Filed Dec. 27, 1961  2 Sheets-Sheet 2

INVENTOR.
KARL A. DAVIS
BY
*Gerald A. Loris*
ATTORNEY

3,191,436
ELECTROMAGNETIC FLOWMETER
Karl A. Davis, Woodland Hills, Calif., assignor to
North American Aviation, Inc.
Filed Dec. 27, 1961, Ser. No. 162,365
2 Claims. (Cl. 73—194)

This invention relates to an improved magnetic flowmeter adapted to measure the flow rate of ionized or electrically conductive fluids.

The electromagnetic flowmeter is an extremely suitable device for measuring the flow rate of electrically conductive fluids. In liquid metals, mechanical flowmeters such as the rotameter, orifice and venturi types, are unreliable and subject to total failure because they generally require constricting, protruding, or movable parts in the flow stream. Fouling or even total failure may result from the deposition of oxides in such constrictions and movable parts, or from the corrosive and erosive action and high temperatures generally encountered.

These problems do not arise with the electromagnetic and permanent magnet flowmeters, since the detector is located externally of the piping and no constrictions or moving parts are required in the path of flow. The operation of these flowmeters is similar in principle to the electrical generator. The liquid conductor flows through a conduit between the poles of a permanent magnet or electromagnet, and traverses the magnetic field at right angles. Due to the relative motion between the moving liquid and magnetic lines of force, an electromotive force (E.M.F.) is generated normal to the magnetic field and the direction of fluid motion. The magnitude of this E.M.F. is, by Faraday's law, directly proportional to the magnetic field intensity, the conduit diameter, and the rate at which the lines of force are cut, or the average fluid velocity. A potential difference is thus obtained between two electrodes which diametrically penetrate or contact the conduit, perpendicular to its axis and to the magnetic lines of force. An indicating or recording instrument connected across the electrodes measures the fluid flow rate directly since the generated voltage is a linear function of fluid velocity.

The electromagnetic and permanent magnet flowmeters provide many advantages due to their simplicity, ruggedness, and manner of operation. They are very reliable instruments, easily adaptable to remote operation, capable of measuring wide flow ranges, require a minimum of maintenance, and installation can be accomplished without dismantling the piping system. These flowmeters have a linear calibration curve which is independent of flow characteristics, and liquid constants such as specific heat, density, thermal conductivity, viscosity, and temperature, in the case of the electromagnetic type. In addition, they are very useful in measuring instantaneous fluid velocities due to their extremely fast response. A very important advantage from an operational standpoint is that no additional pressure drop is introduced into the system by this type of flowmeter. These advantages make the electromagneitc flowmeter very suitable in nuclear systems, where reliability is essential because the presence of radioactivity prevents periodic servicing of the flowmeter. Also, since flow rates must sometimes be measured remotely in such systems, the electromagnetic flowmeter is particularly desirable.

Conventional electromagnetic and permanent magnet flowmeters have certain common disadvantages which this invention has overcome. The most serious of these disadvantages results from the use of electrodes to tap off the E.M.F. generated in the flowing liquid. For example, to ensure flowmeter accuracy when using electrodes, the piping system must be totally wetted to decrease resistance between the liquid and electrodes. With some liquids, this may require several hours of operation. Therefore, after initial installation or following periods of shutdown, substantial time may elapse before reliance can be placed upon the accuracy of the flowmeter. Contact resistance is also produced by another source which is more difficult to alleviate. After periods of shutdown and under certain operating conditions, certain matter, such as oxides, precipitates out on the inside wall of the pipe. The accuracy of the flowmeter is substantially impaired if deposits collect where the electrodes contact or penetrate the pipe.

In practice, the use of electrodes in permanent and electromagnetic flowmeters imposes certain design limitations which tend to increase their cost and complexity. The electrode material must withstand corrosive action of the liquid, and in nuclear systems it must be resistant to deteriorating effects of radioactivity. Also, the flowmeter conduit through which the liquid passes and to which the electrodes are affixed, must have a much lower electrical conductivity than the liquid, in order to minimize current flow in the conduit walls as a result of the induced signal voltage. Furthermore, the electrodes and system piping must be of the same material to prevent the generation of extraneous thermal E.M.F.'s at the hot junctions between the electrodes and piping.

The permanent magnet-type flowmeter has been found unsuitable for high resistivity liquids unless nonpolarizable electrodes are used. Apparently, the D.C. signal current generated in the liquid polarizes other types of electrodes, thereby causing erroneous flow measurements. It is well known that the alternating magnetic flux of the electromagnetic flowmeter either eliminates or reduces polarization effects to a negligible amount. Unfortunately, an alternating magnetic field induces undesirable "background" voltages into the detector circuit of the flowmeter, which are independent of flow rate and, therefore, present and measurable even at zero flow. Therefore, special instrumentation or auxiliary circuits must be added to separate the no-flow voltage from the signal produced by flow.

"Background" voltages are primarily a result of capacitive coupling between the magnet coil and the electrodes, and mutual induction between the liquid and electrodes. The "background" voltage due to capacitive coupling is minimized by such measures as operating the magnet at the lowest possible A.C. potential, electrostatically shielding the electrodes, grounding the magnet core, and using a low frequency of magnet excitation so that the impedance of the coupling capacity will be large. All these measures are beneficial to some extent, except lowering the frequency. The "background" voltage s decreased and the signal voltage remains constant by lowering the frequency, but this produces other adverse operational effects. The response time is decreased, polarization effects may become significant within each cycle if the frequency is sufficiently low, and the amplifier design becomes more complicated.

The "background" voltage due to mutual induction results from the electrodes and their leads acting as a single turn transformer secondary. Since the voltage induced in the leads is independent of flow and is the same order of magnitude as the flow induced voltage, it must be eliminated. One method which has been attempted is the addition of an auxiliary single turn winding to the magnet. This winding is phased oppositely to the one formed by the leads, and a potentiometer is used to adjust the auxiliary voltage to equality with the "background" voltage caused by mutual induction. This would work were it not for non-linear phenomena in the transformer iron which give rise to harmonics in the generated signal voltage. Since the even harmonics do not cancel, an alternative is to limit the flux density in order to maintain the harmonics at a tolerable level. However, this is contrary to the necessity of operating at a high flux density to provide good sensitivity and a high ratio of signal-to-noise voltage. Therefore, either a practical compromise must be reached or additional filtering and compensating circuits must be added to eliminate these "background" or noise voltages. In some cases it has also been found necessary to use a pre-amplifier to raise the signal-to-noise voltage ratio prior to the main amplifier stage. All these expediencies tend to increase the complexity and, therefore, the cost of the flowmeter.

Another disadvantage is the voltage losses which occur in the detector portion of electromagnetic flowmeters. These voltage losses must be minimized because they subtract from the output signal, and the sensitivity of the flowmeter is directly dependent upon this signal. The voltage losses referred to result from circulating eddy-currents which are produced by non-uniformities in the E.M.F. induced in the liquid. For example, radial variations in fluid velocity and the shunting effect of the pipe wall produce a potential gradient which causes eddy-current flow in a plane normal to the fluid axis. Also, the non-uniform and finite character of the magnetic field causes another potential gradient and additional eddy-currents normal to the magnetic field. In practice, the length of pipe throughout which the magnetic field can be maintained substantially uniform is limited by magnet design economics as well as by space and weight considerations. Thus, the flux density falls off at the end of the pole faces thereby producing a potential gradient which causes eddy current flow normal to the magnetic field. If the magnet pole face is not several pipe diameters long these currents extend axially to the central plane of the flowmeter and cause $I^2R$ losses which reduce the output signal voltage.

Accordingly, the primary object of this invention is to provide an improved magnetic flowmeter for measuring the flow rate of electrically conducting fluids.

Another object of this invention is to provide a magnetic flowmeter whose accuracy is not dependent upon the extent to which the pipe system is wetted, and is unaffected by precipitation of oxides, or other temperature soluble matter on the inside surface of the pipe.

It is another object of this invention to provide a magnetic flowmeter whose sensitivity is not decreased by voltage losses produced in the fluid by the circulation of eddy-currents.

A further object is to provide a magnetic flowmeter unaffected by the background or noise voltages primarily caused by the application of electrodes to the pipe containing the fluid.

It is a still further object to provide a simplified, more reliable magnetic flowmeter in which the electrodes required as an essential component in prior magnetic flowmeters are eliminated.

Still another object is to provide a magnetic flowmeter which determines fluid flow rates by measuring the degree of distortion produced in the primary magnetic field, by the interaction therewith of additional magnetic fields, created by eddy-currents circulating in the liquid.

Other objects and advantages of this invention will become apparent from the following detailed description and claims, taken in conjunction with the accompanying drawings made a part hereof, in which:

The present invention overcomes the disadvantages of conventional and electromagnetic flowmeters by providing a means by which flow rate is measurable without the use of electrodes. This is accomplished by utilizing the circulating eddy-currents and the magnetic fields they produce, rather than the E.M.F. generated in the liquid, to provide a measure of flow rate. The liquid conductor is conveyed through the magnetic field between the pole pieces of the magnet and traverses the magnetic flux at right angles; the relative motion therebetween produces in the liquid an E.M.F. which is normal to the field and to the axis of the liquid conduit. As the magnet is physically symmetrical, the magnetic flux it produces also has a symmetrical pattern under no-flow conditions. Under flow conditions, however, the primary magnetic field shifts and becomes distorted as a result of interaction with magnetic fields created by the eddy-currents in the liquid. Since the field distortion is determined by the magnitudes of the eddy-currents which are directly related to the E.M.F.'s produced in the liquid, and therefore to the velocity of the liquid, the degree of field distortion is a direct function of fluid velocity. The present invention utilizes this phenomenon to measure the flow rate of the electrically conducting fluid. This is accomplished by providing means for measuring the degree of shift, or distortion, of the primary magnetic field.

Figure 1:
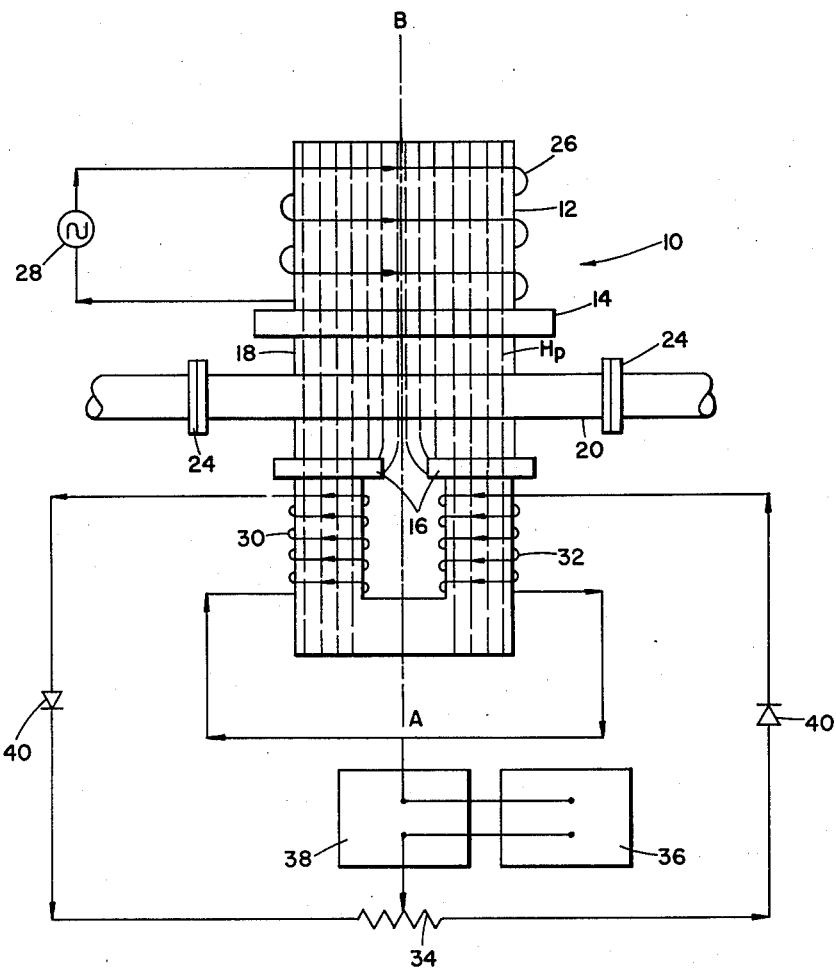
FIG. 1 is a preferred embodiment of this flowmeter, showing a plan view of the magnetic core, the distribution of the primary magnetic field through the core under no-flow conditions, and a schematic circuit diagram of the electrical detection system.
Figure 2:
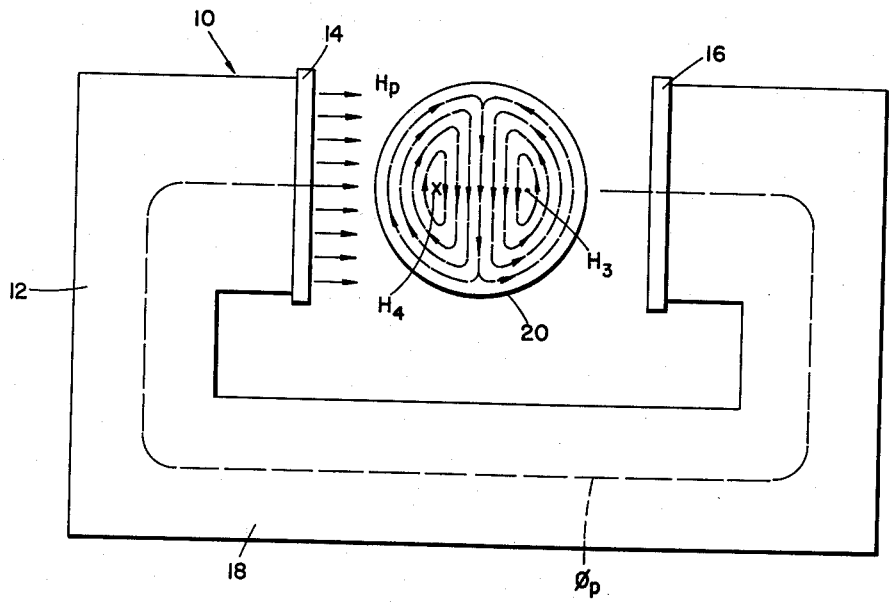
FIG. 2 is an elevational view of this flowmeter, illustrating the path of the primary magnetic field, the eddy-currents which circulate normally to the fluid axis under flow conditions, and the magnetic fields produced by these eddy-currents.

The essential components of a preferred embodiment of the present invention will now be described with reference to the appended drawings. Referring first to FIGS. 1 and 2, this flowmeter utilizes an electromagnet 10 comprising a laminated horseshoe, or C type core 12, having two pole pieces 14 and 16 separated by an air gap. A yoke 18 integrally connects pole pieces 14 and 16, and provides a return path for the magnetic lines of flux $\phi_p$. The pole piece 16 is bifurcated as shown in FIG. 1. The reason for this modification will hereinafter be made clear. A magnetic or ferromagnetic material is used in core 12 in order to obtain maximum flux density. This material also has a high permeability to provide a low reluctance path for the magnetic lines of flux. Such commonly used magnetic materials as iron, steel, silicon steel, or alloys of iron and nickel, are suitable for this purpose. Core 12 is also laminated to render it non-conducting and thereby minimize the power loss due to eddy-currents produced in it by the magnetic field. Pole pieces 14 and 16 are arranged on opposite sides of a conduit 20, through which the fluid conductor is conveyed. Nonmagnetic material is preferably used in conduit 20 to prevent the lines of flux from substantially bypassing pole piece 16 by short circuiting through the conduit. Furthermore, it is desirable that conduit 20 be a poor electrical conductor so that it will not shield the fluid from the primary magnetic field. If the material of the main piping system satisfies these requirements, conduit 20 can be any desired section of the system; otherwise, a section having the above mentioned characteristics should be inserted into the system, as shown in FIG. 1. Conduit 20 is then integrally supported by electromanget 10 and connected to the piping system by flanges 24.

The primary magnetic field is produced by an exciting coil 26 mounted in proximity to pole piece 14, and energized by a 110 volt, 60 cycle alternating current power source 28. The number of turns in coil 26 is governed by the flux density required for the particular range of flow rates being measured. FIG. 2 illustrates how the magnetic lines of flux $\phi_p$ thus produced, pass from pole piece 14, laterally through conduit 20 to pole piece 16, and complete the magnetic circuit through yoke 18.

In FIG. 1, the primary magnetic field $H_p$ is shown as it exists when the fluid is stationary. Since this field is symmetrical about the axis of symmetry A–B of magnet 10, the flux density is the same in each leg of the bifurcated pole 16. However, this is not the case under flow conditions. When the fluid is in motion, the E.M.F. produced by interaction between the fluid conductor and the primary magnetic field is a maximum at the axis of symmetry A–B of the magnet and gradually diminishes to zero in the region adjacent the ends of the pole faces. This potential gradient occurs because the primary magnetic field strength is finite and non-uniform across the pole faces, diminishing from a maximum at the axis of symmetry A–B to zero near the ends of the pole faces.

Figure 3:
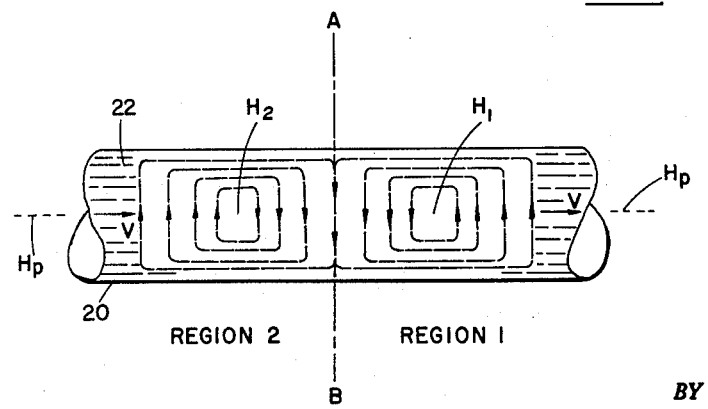
FIG. 3 is a sectional view through the fluid conduit, showing the directions of the primary magnetic field, the fluid, the eddy-currents which circulate normally to the primary magnetic field under flow conditions, and the magnetic fields produced by these eddy-currents.

The eddy-currents produced by this potential gradient are normal to the lines of flux of the primary magnetic field, $H_p$, as illustrated in FIG. 3. The eddy-current magnetic fields, $H_1$ and $H_2$, have lines of flux essentially parallel to that of the primary magnetic field. During half of the A.C. cycle, the eddy-currents circulate counterclockwise in Region 1 and their resultant magnetic field, $H_1$, is in the direction of the primary magnetic field. However, since the eddy-currents circulate clockwise in Region 2, their resultant field, $H_2$, opposes the primary field. Therefore, the flux density, or magnetic induction, increases in Region 1 and decreases in Region 2. The direction of the eddy-currents, their magnetic fields and, therefore, the shift in flux density, reverses during the other half of the A.C. cycle.

Further distortion of the primary magnetic field is caused by radial variations in fluid velocity, which produce a potential gradient and concomitant eddy-currents circulating in a plane normal to the axis of flow. FIG. 2 illustrates the direction of the primary magnetic field, $H_p$, during half of the A.C. cycle, and the paths of flow of these eddy-currents when the direction of fluid flow is into the plane of this view. The resultant magnetic fields, $H_3$ and $H_4$, created by these eddy-currents, are normal to the primary field, $H_p$. The net effect of interaction between these fields is a shifting of the primary field, $H_p$, axially along conduit 20.

Figure 4:
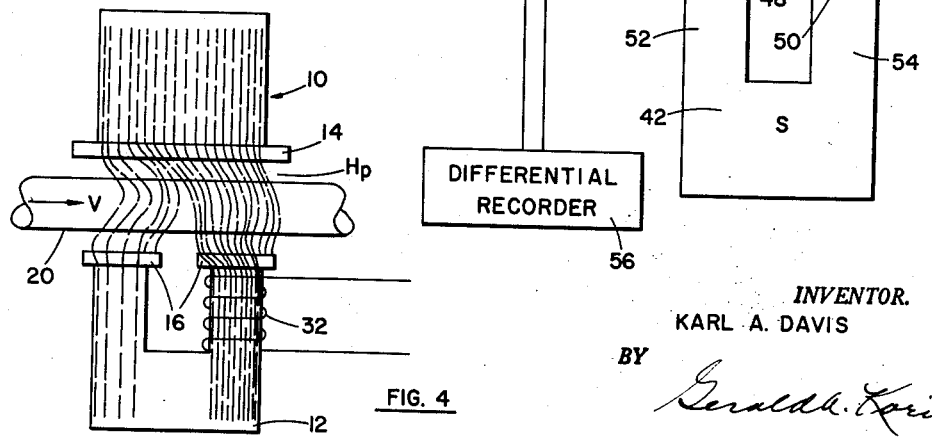
FIG. 4 is a plan view of the core of this flowmeter, illustrating the distortion of the primary magnetic field under flow conditions.

The degree of distortion produced in the primary magnetic field, $H_p$, is a linear function of fluid velocity, as indicated above. Various means can be employed to measure such distortion to ascertain the fluid velocity or flow rate. In this particular embodiment, this is accomplished by mounting secondary coils 30 and 32, FIG. 1, on each branch of bifurcated pole 16, and measuring the E.M.F.'s induced therein by mutual induction. Induction coils 30 and 32 are connected in series to produce E.M.F.'s of opposite polarity. They are preferably connected in series-aiding rather than series-opposing. In addition, coils 30 and 32 are provided with the same number of windings so that E.M.F.'s of equal magnitude are induced therein at no-flow, due to the equality of flux density in each branch of pole 16. The induction coils are further connected into a bridge circuit arrangement which utilizes a potentiometer 34 connected in series, and a voltmeter 36 connected in parallel with the coils. Since it is desirable to provide a zero voltage signal at no-flow, the potentiometer is employed to equalize the resistances of each branch of the bridge circuit, in the event they are unbalanced as a result of errors or inconsistencies in coil windings. Thus, by proper adjustment of potentiometer 34, the currents through voltmeter 36 can be adjusted to obtain a zero signal reading at no-flow. When fluid 22 is in motion, however, the primary magnetic field becomes distorted in the direction shown in FIG. 4, during half of the A.C. cycle, and in the opposite direction during the other half of the cycle. Due to this phenomenon E.M.F.'s of different magnitude are induced in coils 30 and 32, thereby unbalancing the bridge circuit and causing current flow through voltmeter 36. Voltmeter 36 is calibrated to measure the resulting voltage signal in terms of fluid flow rate.

Since the voltage signal produced by fluid motion is very low, it is fed to amplifier 38, FIG. 1, before going to voltmeter 36. This is necessary since the signal is generally too low to operate an indicating instrument, and also because an accurate measurement may be difficult to obtain in an environment having high electrical disturbances. A conventional resistance-capacitance (RC) coupled amplifier is suitable or a vacuum tube voltmeter could be employed to perform the combined functions of amplifier 38 and voltmeter 36. The amplifier decreases the effect of extraneous noise voltages by restricting the frequency pass-band of the system and by raising the signal-to-noise voltage ratio. The sensitivity of the flowmeter is adjustable by a gain control (not shown) on amplifier 38.

Rectifiers 40, shown in FIG. 1, are an additional refinement which enables determination of the direction of flow in addition to its magnitude. Voltmeter 36 then becomes a direct current instrument, and it is only necessary to use a calibrated zero-center scale to provide an indication of direction.

Figure 5:
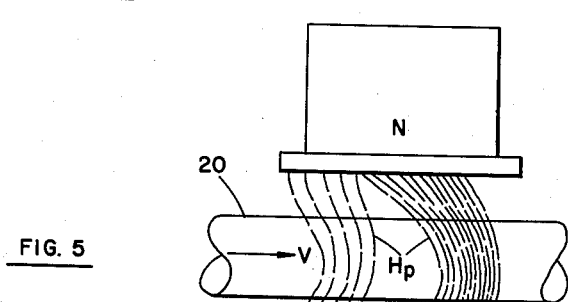
FIG. 5 is a plan view of a second embodiment of this flowmeter, illustrating the magnetic core, the schematic circuit diagram of the electrical detection system, and the distribution of the primary magnetic field under flow conditions.

Although this invention has been described in connection with an electromagnetic flowmeter, it is equally operable in a permanent magnet type. The essential difference in the two instruments is in the means employed to measure field distortion. FIG. 5 illustrates one of several conventional means for obtaining this measurement in a permanent magnet flowmeter. The south pole 42 is bifurcated as is pole 16 in the preferred embodiment, and magnetic field sensors 44 and 46 are mounted on pole faces 48 and 50 of pole pieces 52 and 54. A suitable field sensor for this purpose is a bismuth probe, which produces a D.C. signal in response to the magnetic field acting thereon. The D.C. signals induced in field sensors 44 and 46 are equal when the fluid is stationary, due to the uniformity in field strength across pole faces 48 and 50. Under flow conditions, the flux density becomes non-uniform for reasons explained above, and the field strengths differ in the regions adjacent sensors 44 and 46. Therefore, since the D.C. signal produced is proportional to the field strength, the magnitudes of the signals are different under flow conditions. The signals are fed to a standard differential recorder 56 which is calibrated to measure the numerical difference between them, in terms of fluid flow rate. Thus, recorder 56 registers zero at no-flow and provides a finite reading under flow conditions.

This invention provides a flowmeter having good linearity, sensitivity, stability, and fast response. In addition, since electrodes are not employed in its operation, the disadvantages encountered by their use in conventional flowmeters, are eliminated. For example, the accuracy of this flowmeter is not dependent upon the extent to which the piping system is wetted; nor is the accuracy affected by precipitation of oxides, or other temperature soluble matter, on the inside surface of the pipe. The accuracy is also improved because extraneous background or noise voltages, which are primarily due to the use of electrodes, are no longer present. Also, since electrodes are subject to attack by corrosive and radioactive liquids, their elimination has produced a flowmeter having increased reliability. Finally, since flow rate is not determined by measurement of the E.M.F. induced in the fluid, the voltage losses caused by the circulation of eddy-currents have no effect on the sensitivity of this flowmeter.

Although the invention has been described in its preferred form with a certain degree of particularity, it is understood that the present disclosure has been made only by way of example and numerous changes in the details of construction and the combination and arrangement of parts may be resorted to without departing from the spirit and scope of the invention as hereinafter claimed.

What is claimed is:

1. An improved magnetic flowmeter comprising a permanent magnet producing a primary magnetic field, said permanent magnet having a first pole piece, a second pole piece oppositely spaced therefrom by an air gap spanned by said primary field, said second pole piece being bifurcated and having branches of equal cross-sectional area to provide equal flux densities therein under no fluid-flow conditions; a nonmagnetic conduit having low electrical conductivity, which channels a fluid transversely through said primary field in said air gap; a magnetic field sensor mounted on each branch of said bifurcated pole piece, said field sensors producing a D.C. signal in response to said primary field acting thereon; and an electrical means connected to said field sensors for measuring the differential of said D.C. signals.

2. An improved magnetic flowmeter comprising a magnetic core, a primary exciting coil cooperating with said magnetic core producing a primary magnetic field, said magnetic core having a first pole piece, a second pole piece oppositely spaced therefrom by an air gap spanned by said primary field, said second pole piece being bifurcated and having branches of equal cross-sectional area, a non-magnetic conduit having low electrical conductivity which channels a fluid transversely through said primary field in said air gap, a secondary induction coil mounted on each branch of said bifurcated pole piece, said induction coils producing a voltage signal in response to said primary field acting thereon, an electrical bridge circuit connected to said induction coils which comprises a variable potentiometer in series with said secondary coils, a voltmeter connected across said coils and said potentiometer for measuring in units of fluid flow rate said voltage signals induced in said secondary coils under fluid flow conditions, and means for amplifying said voltage signals to a level sufficient to operate said voltmeter.

References Cited by the Examiner

UNITED STATES PATENTS

| 2,435,043 | 1/48 | Lehde et al. | 73—194 |
| 2,583,724 | 1/52 | Broding | 73—194 |
| 2,608,860 | 9/52 | Ramey et al. | 73—194 |

FOREIGN PATENTS 1,157,500  12/57  France.

RICHARD C. QUEISSER, *Primary Examiner.*